(12) United States Patent
Kanigicherla et al.

(10) Patent No.: US 9,772,858 B2
(45) Date of Patent: Sep. 26, 2017

(54) MULTI-ROOT PERIPHERAL COMPONENT INTERCONNECT MANAGER

(75) Inventors: Balaji Kanigicherla, Andhra Pradesh (IN); Dhanumjai Pasumarthy, Andhra Pradesh (IN); Naga Murali Medeme, Andhra Pradesh (IN); Shabbir Haider, Andhra Pradesh (IN); Raja Babu Mailapalli, Andhra Pradesh (IN); Kishor Arumilli, Andhra Pradesh (IN); Chandra Kumar Chettiar, Andhra Pradesh (IN)

(73) Assignee: Ineda Systems Inc., Santa Clara, CA (US)

( * ) Notice: Subject to any disclaimer, the term of this patent is extended or adjusted under 35 U.S.C. 154(b) by 814 days.

(21) Appl. No.: 14/112,379

(22) PCT Filed: Apr. 20, 2012

(86) PCT No.: PCT/IN2012/000294
§ 371 (c)(1),
(2), (4) Date: Oct. 17, 2013

(87) PCT Pub. No.: WO2012/143954
PCT Pub. Date: Oct. 26, 2012

(65) Prior Publication Data
US 2014/0032811 A1  Jan. 30, 2014

(30) Foreign Application Priority Data

Apr. 21, 2011 (IN) .............................. 1387/CHE/2011

(51) Int. Cl.
*G06F 13/40* (2006.01)
*G06F 9/44* (2006.01)
(Continued)

(52) U.S. Cl.
CPC .......... *G06F 9/4413* (2013.01); *G06F 1/1632* (2013.01); *G06F 9/4411* (2013.01); *G06F 13/12* (2013.01); *G06F 13/4081* (2013.01)

(58) Field of Classification Search
CPC ...... G06F 1/1632; G06F 1/203; G06F 9/4413; G06F 9/44505; G06F 12/0646; G06F 13/40
(Continued)

(56) References Cited

U.S. PATENT DOCUMENTS 7,979,592 B1 * 7/2011 Pettey ................... G06F 13/404
709/205
8,392,625 B2 * 3/2013 Gopalakrishnan ...... G06F 9/545
710/62

(Continued)

OTHER PUBLICATIONS

Written Opinion of the International Search Report, PCT/IN2012/000294, China International Search Authority, Completed Sep. 24, 2012, Mailed Oct. 4, 2012.
(Continued)

*Primary Examiner* — Glenn A Auve
(74) *Attorney, Agent, or Firm* — Workman Nydegger

(57) ABSTRACT

Described herein is a detachable multi-host computing system (100) having multiple host processors running different operating systems. In one implementation, the multi-host computing system (100) includes a detachable unit (102) and a base unit (104). Each of the detachable unit (102) and the base unit (104) includes an MR-IOV switch and a MR-PCIM for controlling the MR-IOV switch. In one embodiment, the MR-PCIM for both the detachable unit (102) and the base unit (104) is configured such that a single MR-PCIM switch may be used for enumerating peripheral devices connected to the detachable unit (102) and the base unit (104) when the detachable unit (102) and the base unit (104) are in an attached mode.

16 Claims, 2 Drawing Sheets

(51) Int. Cl.
*G06F 1/16* (2006.01)
*G06F 13/12* (2006.01)

(58) Field of Classification Search
USPC .................................. 710/104, 303, 304
See application file for complete search history.

(56) References Cited

U.S. PATENT DOCUMENTS

| | | | |
|---|---|---|---|
| 8,392,645 B2* | 3/2013 | Miyoshi | G06F 13/4027 710/104 |
| 8,751,713 B2* | 6/2014 | Ayzenfeld | G06F 13/105 710/104 |
| 2007/0186025 A1 | 8/2007 | Boyd et al. | |
| 2008/0147887 A1 | 6/2008 | Freimuth et al. | |
| 2008/0147943 A1 | 6/2008 | Freimuth et al. | |
| 2010/0115329 A1 | 5/2010 | Tanaka et al. | |
| 2010/0153592 A1* | 6/2010 | Freimuth | G06F 13/4022 710/38 |
| 2012/0166690 A1* | 6/2012 | Regula | G06F 13/404 710/104 |
| 2012/0284437 A1* | 11/2012 | Ayzenfeld | G06F 13/14 710/104 |
| 2013/0159572 A1* | 6/2013 | Graham | G06F 13/14 710/104 |

OTHER PUBLICATIONS

International Search Report, PCT/IN2012/000294, China International Search Authority, Completed Sep. 18, 2012, Mailed Oct. 4, 2012.

* cited by examiner

MULTI-ROOT PERIPHERAL COMPONENT INTERCONNECT MANAGER

CROSS-REFERENCE TO RELATED APPLICATIONS

This application claims priority to and the benefit of PCT Application Serial No. PCT/IN2012/000294, filed on Apr. 20, 2012, entitled "MULTI-ROOT PERIPHERAL CONNECT INTERFACE MANAGER", which also claims priority to and the benefit of Indian Patent Application No. 1387/CHE/2011, entitled "MULTI-ROOT PERIPHERAL CONNECT INTERFACE MANAGER", filed on Apr. 21, 2011, which are incorporated herein in their entirety.

FIELD OF INVENTION

The present subject matter, in general, relates to a multi-host computing system running multiple operating systems and in particular to a multi-root peripheral component interconnect manager for the multi-host computing systems.

BACKGROUND

A typical computing system includes, among other things, host processors, memory controllers, media hardware accelerators, and a peripheral controller. While the memory controller helps the host processor to interface with a local memory, the peripheral controller provides the access to all the input and output (I/O) devices, viz., serial ATA (hard disk drive or BD/DVD/CD ROM drives), Universal Serial Bus (Key board/Mouse, external ports), Peripheral Component Interconnect (PCI), PCI-Express (PCIe) expansion slots, Ethernet (network connectivity), etc.

Generally, the I/O devices are virtualized by software, such as a hypervisor, to enable multiple hosts to share the same system resources. The hypervisor or a virtual machine monitor (VMM) provides a platform for isolated execution of system images and manages access between the system images and the attached I/O devices. Standards for PCIe based I/O virtualization, where multiple system images are implemented on a single host processor, are specified by Peripheral Component Interconnect Special Interest Group (PCI-SIG) in the single root input-output virtualization (SR-IOV) standard. However, the overhead of such virtualization techniques results in lesser performance and consume higher compute resources.

The capabilities of the SR-IOV standard have been extended by a multi root input-output virtualization (MR-IOV) standard to allow virtualization of the I/O devices between multiple host processors based on the standards of MR-IOV provided by the PCI-SIG. However, in order to virtualize the system following MR-IOV standards, a lot of components need to be made MR-IOV compliant. In addition, a MR-IOV switch needs to be implemented which adds additional component to the system.

SUMMARY

This summary is provided to introduce concepts related to a multi-root peripheral component interconnect (PCI) manager (MR-PCIM) provided in a multi-host computing systems running multiple operating systems which are further described below in the detailed description. This summary is not intended to identify essential features of the present subject matter nor is it intended for use in determining or limiting the scope of the present subject matter. These and other features, aspects, and advantages of the present subject matter will be better understood with reference to the following description.

In one implementation, a multi-root Peripheral Component Interconnect (PCI) Manager (MR-PCIM) is described. The MR-PCIM may be configured to enumerate at least one peripheral device coupled to at least one of a primary MR-IOV switch and a secondary MR-IOV switch associated with the MR-PCIM, where the primary MR-IOV switch and the secondary MR-IOV switch reside at separate processing units of a multi-host computing system coupled through a physical cross-link. The MR-PCIM may further be configured to generate a port table for the primary MR-IOV switch, associated with the at least one peripheral device; where the port table is indicative of ports and cross-link through which the at least one peripheral device is coupled to a respective MR-IOV switch from amongst the primary MR-IOV switch and the secondary MR-IOV switch.

The MR-PCIM may further be also configured to translate the system PCIe connectivity table to generate a translated system PCIe connectivity table for the secondary MR-IOV switch, associated with the at least one peripheral device; where the translation is based on the at least one peripheral device coupled to the secondary MR-IOV switch and the primary MR-IOV switch.

BRIEF DESCRIPTION OF DRAWINGS

The above and other features, aspects and advantages of the subject matter will be better understood with regard to the following description and accompanying drawings, where.

DETAILED DESCRIPTION

Figure 1:
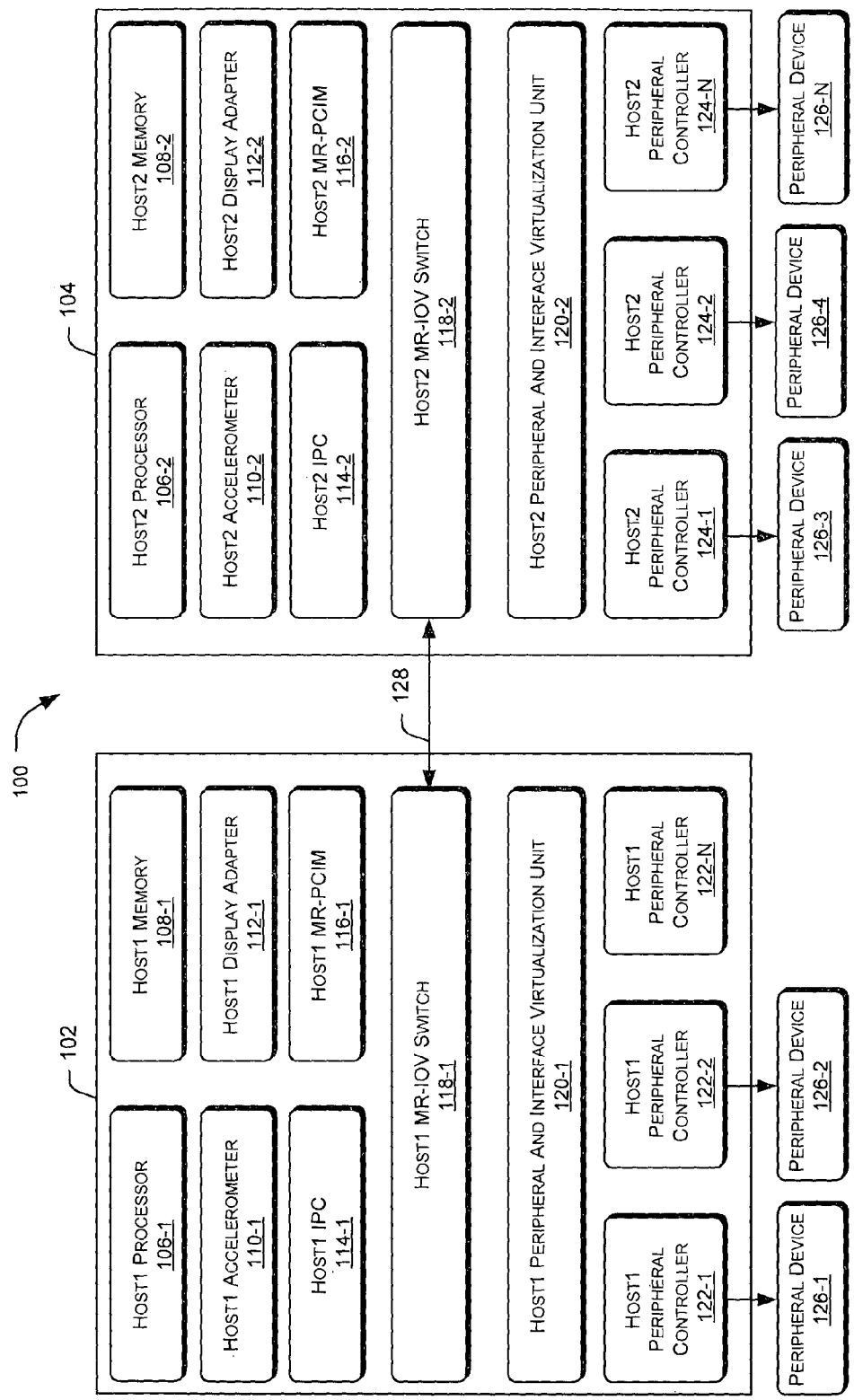
FIG. 1 illustrates an exemplary detachable multi-host computing system, according to an embodiment of the present subject matter.

The present subject matter relates to a multi-root peripheral component interconnect (PCI) manager (MR-PCIM) for multi-host computing systems running multiple operating systems. The MR-PCIM enables multi host systems to implement I/O virtualization for concurrently accessing peripheral devices connected to the multi-host computing systems. In one implementation, the multi-host computing system is a detachable computing system having a detachable unit connected to a base unit. The detachable unit may be, for example, a display unit, whereas the base unit may be, for example, an input device.

In general, I/O virtualization relates to a capability of the peripheral devices to be used by more than one operating system executing on a single host processor. Conventionally, a virtualization intermediary (VI) or a hypervisor, such as a virtual machine monitor (VMM), is used to enable sharing of the peripheral devices connected to the single host processor. For a single root I/O virtualization, where multiple operating systems work on a single host processor and share virtualized peripheral devices, a single root input-output virtualization (SR-IOV) has been developed by the Peripheral Component Interconnect Special Interest Group (PCI-SIG).

Additionally, multi-root I/O virtualization (MR-IOV) standard defined by the PCI-SIG provides PCIe protocol for virtualizing the peripheral devices and further, routing information between the virtualized peripheral devices and multiple host processors in a multi-host computing system. The multi-host computing system typically includes an MR-IOV switch for sharing the peripheral devices between the multiple host processors. The MR-IOV switch is programmed to virtualize the peripheral devices such that each host processor may access the peripheral devices connected to the host processor.

Further, with advent in computing technology, a multi-host computing system may have a detachable unit connected to a base unit. The detachable unit may be a display such as an LCD screen configured to function as a standalone computing system, such as a tablet PC having a host processor running an operating system. The base unit may be understood as a processing unit with input devices, such as a keyboard and mouse, having a host processor running an operating system. Each of the detachable unit and the base unit further include individual MR-IOV switches. Each MR-IONT switch of a particular unit is configured to virtualize the peripheral devices connected to the particular unit. However, including two MR-IOV switches may increase the number of components in the multi-host computing system. Further, the MR-IONT switch of each particular unit may need to virtualize the peripheral devices connected to the particular unit each time the particular unit is detached from or attached to the other unit, thus increasing synchronization time required for detach and attach procedure.

To this end, a multi-root peripheral component interconnect (PCI) manager (MR-PCIM) for detachable multi-host computing systems is disclosed. The detachable multi-host computing system, hereinafter referred to as the system, includes a detachable unit and a base unit. Each of the base unit and the detachable unit, referred to as the unit, includes a host processor running an operating system. The system further includes an MR-IOV switch for interfacing the peripheral devices and the system thus providing a multi-root I/O virtualization capability between two or more host processors of the system. The MR-IOV is configured to virtualize the peripheral devices connected to both the units. In one implementation, the MR-PCIM is configured to control the MR-IOV switch. The MR-PCIM performs various functionalities, for example, identifying the peripheral devices connected to the units, and configuring the MR-IOV switch to virtualize the peripheral devices.

In one embodiment, the MR-PCIM for both the units is configured such that a single MR-IOV switch may be used for enumerating the peripheral devices connected to both the units when the units are connected to each other, i.e., when the units are in an attached mode. The MR-PCIM of the MR-IOV switch enumerating the peripheral device, referred to as a primary MR-IOV switch, identifies the peripheral device connected to both the units and generates a system PCIe connectivity table having a list of all the peripheral devices and corresponding ports to which the peripheral devices are connected. The MR-PCIM of the primary MR-IOV switch then provides a similar system PCIe connectivity table to the MR-PCIM of the other MR-IOV switch, referred to as a secondary MR-IOV switch. Sharing the system PCIe connectivity table between the MR-PCIM of both the MR-IOV switches helps reducing the synchronization time required for detach and attach procedure as the MR-IOV switches do not need to virtualize the peripheral devices when both the units are detached, i.e., are in a detached mode. Further, enabling a single MR-IOV switch to virtualize the peripheral devices connected to both the units reduces the required synchronization time, and also facilitates in reducing the number of required components, such as virtual switches of the MR-IOV switches.

Devices that can implement the disclosed system(s) and method(s) include, but are not limited to, desktop computers, hand-held devices, multiprocessor systems, microprocessor based programmable consumer electronics, laptops, network computers, minicomputers, mainframe computers, and the like which utilize multiple processors on the same hardware platform. In one implementation, the method can also be implemented for systems running any operating system such as Linux, Unix, Microsoft® Windows®, Mac OS X®, Android, and the like. Although the description herein is with reference to certain multi-host computing systems running particular operating systems, the systems and methods may be implemented in other operating systems and computing systems, albeit with a few variations, as will be understood by a person skilled in the art.

Multiple operating systems are typically used to perform different functions on the same hardware platform. Each operating system may provide a particular advantage over different operating system (OS). For example, in a multi-host computing system which may run two different operating systems, OS 1 and OS 2, the OS 1 may provide better performance or support more applications than OS 2 however, the OS 2 may consume less resources such as memory, processing power, battery power when compared to OS 1. In such a scenario, the computing system may implement OS 1 for application processing and computational purposes whereas the computing system may implement OS 2 when the OS-1 is used for other purposes.

Although the present subject matter has been described in relation to two host processors, it will be understood that the system architecture may be implemented for two or more host processors.

FIG. 1 illustrates an exemplary detachable multi-host computing system 100, according to an embodiment of the present subject matter. Examples of the detachable multi-host computing system 100 include, but are not limited to, laptops; computing devices, such mainframe computers, workstations, personal computers, desktop computers, minicomputers, servers, and multiprocessor systems, connected to each other via a PCIe or PCI connector; computing devices, say a laptop, connected, using a PCIe connector, to a cellular communicating device, such as a personal digital assistant, a smart phone, and a mobile phone.

The detachable multi-host computing system, hereinafter referred to as the system 100, includes a detachable unit 102 and a base unit 104, referred to as the processing units (102, 104). The units (102, 104) may individually include multiple host processors for providing processing capability to each of the units. The detachable unit 102 may be a display device, such as an LCD screen configured to function as a standalone computing system, such as a tablet PC having a host1 processor 106-1 running a host1 operating system (OS) (not show in the figure). The base unit 104 may be understood as an input device, such as a keyboard and mouse having a host2 processor 106-2 running a host2 operating system (OS) (not show in the figure). Each of the units (102, 104) includes a system memory, a host1 memory 108-1 coupled to the host1 processor 106-1, and a host2 memory 108-2 coupled to the host2 processor 106-2.

The detachable unit 102 further includes a host1 accelerometer 110-1, a host1 display adapter 112-1, a host1 inter-process communication (IPC) 114-1, a host1 MR-PCIM 116-1, a host1 MR-IOV switch 118-1, a host1 peripheral and interface virtualization unit (PVU) 120-1, and one or more host1 peripheral controller(s) 122-1, 122-2, ..., 122-N, hereinafter referred to as the host1 peripheral controller(s) 122. The base unit 104 includes a host2 accelerometer 110-2, a host2 display adapter 112-2, a host2 IPC 114-2, a host2 MR-PCIM 116-2, a host2 MR-IOV switch 118-2, a host2 PVU 120-2, and one or more host2 peripheral controller(s) 124-1, 124-2, ..., 124-N, hereinafter referred to as the host2 peripheral controller(s) 124. For the sake of clarity, the MR-PCIM 116-1 and the MR-PCIM 116-2 are collectively referred to as MR-PCIM(s) 116 hereinafter. Similarly, the host1 MR-IOV switch 118-1 and the host2 MR-IONT switch 118-2 are collectively referred to as MR-IOV switch(s) 118 herinafter.

The host1 accelerometer 110-1 and the host2 accelerometer 110-2 are configured to sense orientation of the detachable unit 102. The host1 display adapter 112-1 and the host2 display adapter 112-2 are configured to transmit display or video signals to an external visual display unit (not shown in the figure). The host1 MR-IOV switch 118-1 and the host2 MR-IOV switch 118-2, collectively referred to as the MR-IOV switches 118 are provided in the units (102, 104) for interfacing one or more peripheral device(s) 126-1, 126-2, 126-3, ..., 126-N, hereinafter referred to as the peripheral device(s) 126 and the system 100. In one implementation, the host1 MR-IONT switch 118-1 and the host2 MR-IOV switch 118-2 connect to the peripheral devices 126 through the host1 PVU 120-1 and the host2 PVU 120-2, respectively. The host1 PVU 120-1 and the host2 PVU 120-2 are further coupled to the peripheral devices 126 through the host1 peripheral controllers 122 and the host2 peripheral controllers 124. The host1 PVU 120-1 and the host2 PVU 120-2, collectively referred to as the PVU 120, help in virtualization of the peripheral devices 126 and facilitates simultaneous sharing of devices, like printers, keyboard, mouse, display unit, etc., among multiple operating systems or multiple processors, i.e., the host1 processor 106-1 and the host2 processor 106-2. The MR-IOV switches 118 thus provide a multi-root I/O virtualization capability between multiple host processors, i.e., the host1 processor 106-1 and the host2 processor 106-2 of the system 100.

For example, the host1 MR-IOV switch 118-1 facilitates communication between the host1 processor 106-1 and the peripheral devices (126-1, 126-2), through the host1 PVU 120-1 and the host1 peripheral controllers (122-1, 122-N). Similarly, the host2 MR-IOV switch 118-2 facilitates communication between the host2 processor 106-2 and the peripheral devices (126-3, 126-N), through the host2 PVU 120-2 and the host2 peripheral controllers (124-1, 124-N).

The MR-IOV switches 118 are further configured to virtualize the peripheral devices 126 connected to the corresponding units (102, 104), for example, when the system 100 is powered up or whenever a new peripheral device is connected to the system 100. Thus, in the above example, the host1 MR-IOV switch 118-1 virtualizes the peripheral devices (126-1, 126-2), whereas the host2 MR-IOV switch 118-2 virtualizes the peripheral devices (126-3, 126-N). In one implementation, the host1 MR-PCIM 116-1 and the host2 MR-PCIM 116-2 are configured to control the host1 MR-IOV switch 118-1 and the host2 MR-IOV switch 118-2. The host1 MR-PCIM 116-1 and the host2 MR-PCIM 116-2, collectively referred to as the MR-PCIM(s) 116, perform various functionalities, for example, identifying the peripheral devices 126 connected to the units 102, and configuring the MR-IOV switches 118 to virtualize the peripheral devices 126. Further each of the host1 MR-PCIM 116-1 and the host2 MR-PCIM 116-2, is configured to generate a system PCIe connectivity table having a list of all the peripheral devices 126 connected to the units (102, 104) and corresponding ports of the units (102, 104) to which the peripheral devices 126 are connected.

Further, each of the MR-IOV switches 118 includes one or more virtual switches (not shown in this figure) facilitating communication of the MR-IOV switch 118 with the corresponding MR-PCIM 116 and the corresponding host processor 106.

In one implementation, the units 102 work in two modes, an attached mode and a detached mode. In the attached mode, the detachable unit 102 and the base unit 104 are connected to each other through a physical cross-link 128 between the host1 MR-IOV switch 118-1 and the host2 MR-IOV switch 118-2 and thus act as a multi-host computing system, i.e., the system 100. The physical cross-link 128 may be the PCIe or any other peripheral connectivity link. In the detached mode, the physical cross-link 128 is removed and the detachable unit 102 works as a standalone single host computing system.

Further, the MR-PCIMs 116 are configured such that in the attached mode a single MR-IOV switch 118 may be activated and used for enumerating the peripheral devices 126 connected to both the units (102, 104). In such a case, the MR-PCIM 116 of the active MR-IOV switch 118, referred to as a primary MR-IOV switch, identifies the peripheral devices 126 connected to both the units (102, 104). In one implementation, the primary MR-IOV switch may be identified based on the number of the peripheral devices 126 connected to the unit (102, 104) corresponding to the MR-IOV switch 118. For the purpose, the MR-IOV switches 118 exchange a dynamic handshake signal containing the number of peripheral devices 126 connected to the corresponding units (102, 104). The MR-IOV switch 118 corresponding to the unit (102, 104) connected to maximum number of the peripheral devices 126 is then selected as the primary MR-IOV switch, whereas the other MR-IOV switch is selected as a secondary MR-IOV switch. For example, in the present example, the base unit 104 is connected to three peripheral devices, i.e., the peripheral devices 126-3, 126-4, and 126-N, whereas the detachable unit 102 is connected to two peripheral devices, i.e., the peripheral devices 126-1 and 126-2. Thus, in the present example, the host2 MR-IONT switch 118-2 may be selected as the primary MR-IOV switch, whereas the host1 MR-IOV switch 118-1 is selected as the secondary MR-IOV switch.

In another implementation, the MR-IOV switches 118 may be pre-configured such that one of the MR-IOV switches 118, say the host2 MR-IOV switch 118-2 always functions as the primary MR-IOV switch, whereas the MR-IOV switch 118-1 always functions as the secondary MR-IOV switch in the attached mode.

Further, the MR-PCIM corresponding to the primary MR-IOV switch is referred to as a primary MR-PCIM, whereas the MR-PCIM corresponding to the secondary MR-IOV switch is referred to as a secondary MR-PCIM. Thus in the present example, the host2 MR-PCIM 116-2 is referred to as the primary MR-PCIM, whereas the host1 MR-PCIM 116-1 is referred to as the secondary MR-PCIM. Thus, each time the detachable unit 102 is attached to the base 104 the primary MR-IOV switch and the primary MR-PCIM are selected. The primary MR-IOV switch, using the primary MR-PCIM, then enumerates the physical devices 126 connected to both the units (102, 104).

The primary MR-PCIM 116-2 in such a case, generates a system PCIe connectivity table having a list of all the peripheral devices 126 and corresponding ports of the units (102, 104) to which the peripheral devices 126 are connected. The primary MR-PCIM 116-2 may similarly generate other various tables, such as a bridge table and a switch table. In one implementation, the system PCIe connectivity table is designed such that all the peripheral devices 126 connected to the unit (102, 104) corresponding to the primary MR-IOV switch, i.e., the base unit 104 in the above example, are listed first, followed by the peripheral devices 126 connected to the unit (102, 104) corresponding to the secondary MR-IOV switch, i.e., the detachable unit 102 in the above example.

In the above example, the system PCIe connectivity table generated by the host2 MR-PCIM 116-2 may be similar to the following exemplary table (Table 1):

| Switch | Port | Type (Identifier) | Type (Identifier) |
|---|---|---|---|
| Switch 1 | Port 0 | Peripheral device 126-3 (S1-P0) | |
| Switch 1 | Port 1 | Peripheral device 126-4 (S1-P1) | |
| Switch 1 | Port 2 | Peripheral device 126-N (S1-P2) | |
| Switch 1 | Port 3 | Cross-Link to Switch 2 (S1-P3) | |
| | | Switch 2 Port 0 | Cross-Link to Switch 1 (S1-P3-S2-P0) |
| | | Switch 2 Port 1 | Peripheral device 126-1 (S1-P3-S2-P1) |
| | | Switch 2 Port 2 | Peripheral device 126-2 (S1-P3-S2-P2) |

As can be seen in the above table, the peripheral devices 126-3, 126-4, and 126-N are listed first along with the corresponding ports followed by the peripheral devices 126-1 and 126-2. Further, the peripheral devices 126-1 and 126-2 are listed under the title cross-link to switch 2' thus signifying the connection of the peripheral devices 126-1 and 126-2 through the cross-link 128. The primary MR-IOV, i.e., the host2 MR-IOV 118-2 can thus easily identify the peripheral devices 126 connected to the base unit 104 and the detachable unit 102, and the host2 MR-PCIM 116-2 would thus not need to re-enumerate the peripheral devices 126 in the detached mode. Additionally, a system PCIe connectivity table is generated each time a peripheral device is connected to either of the units (102, 104) and enumerated by the primary MR-IOV.

Thus the system PCIe connectivity table is generated in a structured form by the primary MR-PCIM. Further, the system PCIe connectivity table has a unique numbering to each peripheral device 126 and a path to reach the peripheral devices 126 through the PVUs 120. The primary MR-PCIM is further configured to store a time-stamp of the enumeration as a reference along the system PCIe connectivity table. The time-stamp refers to the time at which a particular system PCIe connectivity table was generated. Thus each time a system PCIe connectivity table is generated a reference time-stamp is generated, with the time-stamp corresponding to the last system PCIe connectivity table being referred to as the last sync stamp of the base unit 104.

Once a system PCIe connectivity table is generated by the primary MR-PCIM, a translated system PCIe connectivity table is generated for the secondary MR-IOV switch. The translated system PCIe connectivity table is similar to the system PCIe connectivity table and includes the list of all the peripheral devices 126 and corresponding ports of the units (102, 104) to which the peripheral devices 126 are connected. In one implementation, the translated system PCIe connectivity table is designed such that all the peripheral devices 126 connected to the unit (102, 104) corresponding to the primary MR-IOV switch, i.e., the base unit 104 in the above example, are listed first, followed by the peripheral devices 126 connected to the unit (102, 104) corresponding to the secondary MR-IOV switch, i.e., the detachable unit 102 in the above example. In one implementation, the MR-PCIM runs a cascaded MR-IOV switch table transformation algorithm (CAMSTTA) for transforming the system PCIe connectivity table to generate the translated system PCIe connectivity table.

In the above example, the translated system PCIe connectivity table generated by the host2 MR-PCIM 116-2 may be similar to the following exemplary table (Table 2):

| Switch | Port | Type (Identifier) | Type (Identifier) |
|---|---|---|---|
| Switch 1 | Port 0 | Cross-Link to Switch 2 (S1-P0) | |
| | | Switch 2 Port 0 | Peripheral device 126-3 (S1-P0-S2-P0) |
| | | Switch 2 Port 1 | Peripheral device 126-4 (S1-P0-S2-P1) |
| | | Switch 2 Port 2 | Peripheral device 126-N (S1-P0-S2-P2) |
| | | Switch 2 Port 3 | Cross-Link to Switch 1 (S1-P0-S2-P3) |
| Switch 1 | Port 1 | Peripheral device 126-1 (S1-P1) | |
| Switch 1 | Port 2 | Peripheral device 126-2 (S1-P2) | |

As can be seen in the above table, the peripheral devices 126-3, 126-4, and 126-N are listed first along with the corresponding ports followed by the peripheral devices 126-1 and 126-2. Further, the peripheral devices 126-3, 126-4, and 126-N are listed under the title 'cross-link to switch 2' thus signifying the connection of the peripheral devices 126-3, 126-4, and 126-N through the cross-link 128. The secondary MR-IOV, i.e., the host1 MR-IOV 118-1 can thus easily identify the peripheral devices 126 connected to the base unit 104 and the detachable unit 102, and the host1 MR-PCIM 116-1 would thus not need to re-enumerate the peripheral devices 126 in the detached mode. Additionally, the translated system PCIe connectivity table is generated each time a new system PCIe connectivity table is generated.

The translated system PCIe connectivity table along with the corresponding time-stamp is then transferred to the secondary MR-PCIM, i.e., the host1 MR-PCIM 116-1 by the host2 MR-PCIM 116-2 through the host2 IPC 114-2 and the host1 IPC 114-1. The translated system PCIe connectivity table may thus be used by the secondary MR-IOV switch, i.e., the host1 MR-IOV switch 118-1 when the detachable unit 102 is detached from the base unit 104 and the host1 MR-IOV switch 118-1 thus becomes active. Providing the translated system PCIe connectivity table helps the host1 MR-IOV switch 118-1 to identify the peripheral devices 126-1 and 126-2 connected to the detachable unit 102 without enumerating the peripheral devices 126-1 and 126-2, thus reducing the synchronizing time required during detachment. In one implementation, the translated port is generated and transferred to the secondary MR-PCIM each time a new system PCIe connectivity table is generated. In another implementation, the translated system PCIe connectivity table is transferred to the secondary MR-PCIM only when the detachable unit 102 is being detached from the base unit 104.

Thus, when the detachable unit 102 is detached from the base unit 104, the host1 MR-IOV switch 118-1 becomes active and the host1 MR-PCIM 116-1 checks the translated system PCIe connectivity table to find out the peripheral devices 126 connected to the detachable unit 102. In the translated system PCIe connectivity table, the host1 MR-IOV switch 118-1 may ignore the peripheral devices 126 listed under type 'cross-link to switch 2' and identify the remaining peripheral devices, i.e., the peripheral devices 126-1 and 126-2 as the peripheral devices 126 connected to the detachable unit 102. Further, since the peripheral devices 126-1 and 126-2 are already enumerated by the host2 MR-PCIM 116-2, thus the host1 MR-PCIM 116-1 does not need to re-enumerate the peripheral devices 126-1 and 126-2. However, if a new peripheral device is connected to the detachable unit 102, host1 MR-PCIM 116-1 identifies the new peripheral device, the host1 MR-IOV switch 118-1 virtualizes the new peripheral device, and the host1 MR-PCIM 116-1 enumerates the new peripheral device and updates the translated system PCIe connectivity table along with a new time-stamp corresponding to the updated translated system PCIe connectivity table. The time-stamp corresponding to the last updated translated system PCIe connectivity table is referred to as a last sync stamp of the detachable unit 102.

In case when the detachable unit 102 and the base unit 104 are reattached after being detached, the primary MR-IOV switch and the secondary MR-IOV switch are identified. The MR-PCIM 116 of both the units (102, 104) will then exchange the last sync stamp, i.e., the last sync stamp of the detachable unit 102 and the last sync stamp of the base unit 104. The primary MR-IOV switch may then compare both the last sync stamp and determine if the last sync stamp of the detachable unit 102 has been modified after being detached from the base unit 102. In case the last sync stamp of the detachable unit 102 has been modified, the primary MR-PCIM will generate a new system, PCIe connectivity table based on the updated translated system PCIe connectivity table and the system PCIe connectivity table available with the base unit 104. In case the last sync stamp of the detachable unit 102 has not been modified, the primary MR-PCIM uses the system PCIe connectivity table available with the base unit 104. The primary MR-PCIM may then transfer the new translated system PCIe connectivity table to secondary MR-PCIM through the host2 IPC 114-2 and the host1 IPC 114-1.

Additionally or alternatively, unique value, such as a hash value could be created for the system PCIe connectivity table contents, for example, using a hash algorithm in place of the last sync stamp. The unique value could be passed to the secondary MR-PCIM along with the translated system PCIe connectivity table instead of the last sync stamp.

Thus using the system PCIe connectivity tables, the translated system PCIe connectivity table, and the last sync stamps, the detachable unit 102 and the base unit 104 can reattach without enumerating the peripheral devices 126 on reattachment, thus decreasing the required synchronization time and in turn decreasing the required reattach time. Further, the primary MR-IOV switch will transform the new system PCIe connectivity table to generate a new translated system PCIe connectivity table.

As an illustration, consider a user working on a presentation in the attached mode. The user may detach the detachable unit 102 and takes it to present the presentation. The host1 MR-PCIM 116-1, which was in an idle mode till now, becomes active and starts controlling the peripheral devices 126-1 and 126-2. Since the host1 MR-PCIM 116-1 has the translated system PCIe connectivity table, thus the synchronization time required by the host1 MR-IOV switch 118-1 is almost negligible due to which the user can continue his work and present the presentation in the detached mode without any interruption. Now suppose the user needs to make some changes in his work during the presentation and connects a new peripheral device, say a flash drive having the new changes. The host1 MR-PCIM 116-1 then enumerates the flash drive and the host1 MR-PCIM 116-1 updates the translated system PCIe connectivity table. When the user connects the detachable unit 102 to the base unit 104, the primary MR-IOV switch is selected. The primary MR-IOV switch will then automatically synchronize the, peripheral devices, files and folders using the updated translated system PCIe connectivity table and the translated system PCIe connectivity table so that the user can continue his work in the attached mode from the same state in which he exited the detached mode.

Additionally, in a case when the detachable unit 102 and the base unit 104 are powered up in detachable state, the MR-PCIM 116 for both the units (102, 104) will enumerate the peripheral device 126 connected to the units (102, 104) and generate individual system PCIe connectivity tables. When the detachable unit 102 and the base unit 104 are attached, the primary MR-IOV switch and the primary MR-PCIM will be selected. The primary MR-PCIM may then generate a new system PCIe connectivity table based on the individual system PCIe connectivity tables, thus reducing the time required for synchronizing during the attachment.

Further using a single MR-IONT switch 118 in an attached mode helps decreasing the number of components, such as the virtual switches in the MR-IONT switch 118 as unlike in the conventional system the MR-IOV switches 118 do not need an extra virtual switch for communicating with the MR-PCIM 116 of each other. Each of the MR-IOV switches 118 in the present system 100 require only two virtual switches, one for facilitating communication of the MR-IOV switch 118 with the corresponding MR-PCIM 116 and other for facilitating communication of the MR-IOV switch 118 with the corresponding host processor 106. Further, during the attached mode, as the secondary MR-IOV switch and the secondary MR-PCIM are inactive, the virtual switch of the secondary MR-IOV switch may be used for communicating with the primary MR-PCIM, thus reducing the need for an extra virtual switch.

Although the present subject matter has been described in relation to two host processors, it will be understood that the system architecture may be implemented for two or more host processors.

Figure 2:
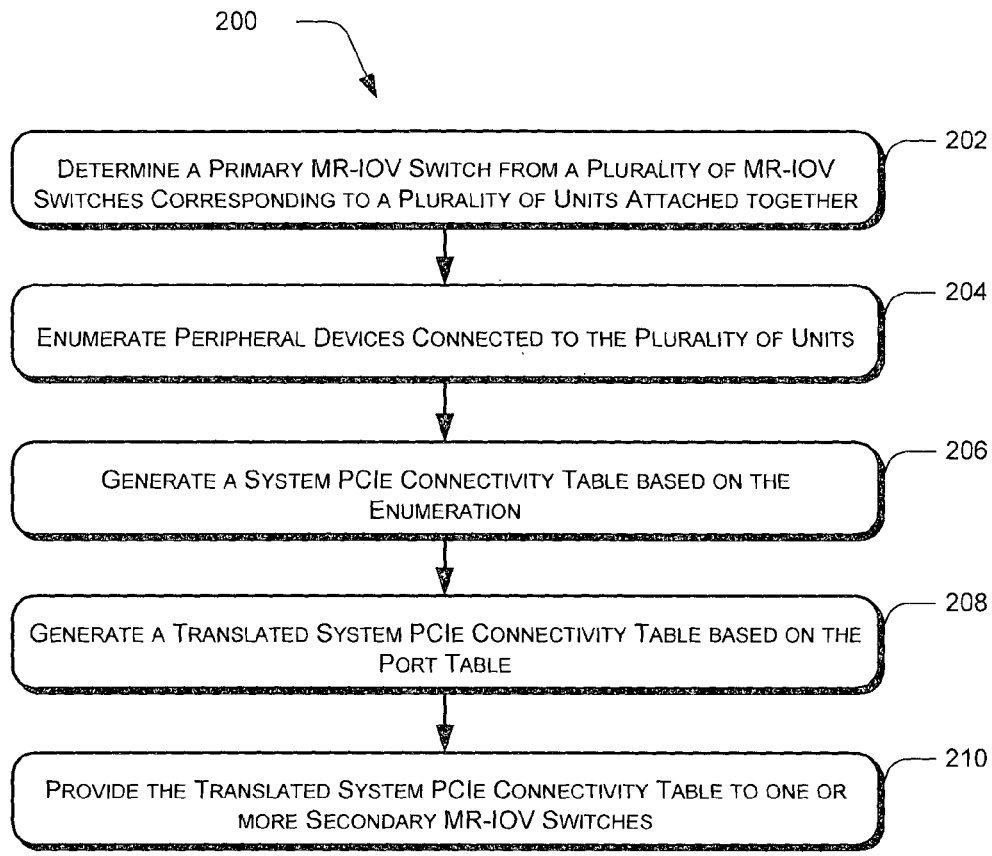
FIG. 2 illustrates an exemplary method for synchronization of peripheral devices connected to the multi-host computing system, according to an embodiment of the present subject matter.

FIG. 2 illustrates an exemplary method 200 for synchronization of system PCIe connectivity information in a multi-host computing system, such as the multi-host computing system 100, according to an embodiment of the present subject matter. The exemplary method 200 may be described in the general context of computer executable instructions embodied on a computer-readable medium. Generally, computer executable instructions can include routines, programs, objects, components, data structures, procedures, modules, functions, etc., that perform particular functions or implement particular abstract data types. The method 200 may also be practiced in a distributed computing environment where functions are performed by remote processing devices that are linked through a communications network. In a distributed computing environment, computer executable instructions may be located in both local and remote computer storage media, including memory storage devices.

The order in which the method 200 is described is not intended to be construed as a limitation, and any number of the described method blocks can be combined in any order to implement the method 200, or an alternative method. Additionally, individual blocks may be deleted from the method 200 without departing from the spirit and scope of the method, systems and devices described herein. Furthermore, the method 200 can be implemented in any suitable hardware, software, firmware, or combination thereof.

Additionally, the method 200 has been described in the context of the multi-host computing system 100 and the MR-PCIM 116; however, other embodiments may also be possible as will be understood by a person skilled in the art.

At block 202, a primary MR-IOV switch is selected from among a plurality of MR-IOV switches corresponding to a plurality of units attached together. For example, when the detachable unit 102 and the base unit 104 are attached together, a primary MR-IOV switch is selected from the host1 MR-IOV switch 118-1 and the host2 MR-IOV switch 118-2. For instance, the host2 MR-IOV switch 118-2 may be selected as the primary MR-IOV switch based on the number of peripheral devices connected to the each of the detachable unit 102 and the base unit 104, with the MR-IOV switch corresponding to the unit (102, 104) having more number of peripheral devices being selected as the primary MR-IOV switch.

At block 204, peripheral devices connected to the plurality of units are enumerated, for example, by the primary MR-PCIM. For instance, the host2 MR-PCIM 116-2 on being determined as the primary MR-PCIM enumerates the peripheral devices 126 connected to the units (102, 104).

At block 206, a system PCIe connectivity table is generated based on the enumeration. For example, the primary MR-PCIM corresponding to the primary MR-IOV switch generates a system PCIe connectivity table having a list of all the peripheral devices connected to the plurality of units and corresponding ports of the plurality of units to which the peripheral devices are connected. For instance, the MR-PCIM 116 generates the system PCIe connectivity table having a list of the peripheral devices 126 connected to the units (102, 104).

At block 208, a translated system PCIe connectivity table is generated based on the system PCIe connectivity table. For example, the primary MR-PCIM switch transforms the system PCIe connectivity table to generate a translated system PCIe connectivity table similar to the system PCIe connectivity table. For instance, the host2 MR-PCIM 116-2 runs the cascaded MR-IOV switch table transformation algorithm CAMSTTA for transforming the system PCIe connectivity table to generate the translated system PCIe connectivity table.

At block 210, the translated system PCIe connectivity table is provided to one or more secondary MR-IOV switches. For example, the primary MR-PCIM transmits the translated system PCIe connectivity table to a secondary MR-PCIM corresponding to each of the secondary MR-IOV switches. For instance, the host2 MR-PCIM 116-2 may transfer the translated system PCIe connectivity table to the host1 MR-PCIM 116-1 through the host2 IPC 114-2 and the host1 IPC 114-1. In one implementation, the translated port is generated and transferred to the secondary MR-PCIM each time a new system PCIe connectivity table is generated. In another the translated system PCIe connectivity table is transferred to the secondary MR-PCIM only when the detachable unit 102 is being detached from the base unit 104.

The method 200 thus describes an embodiment for synchronization of system PCIe connectivity information in a multi-host computing system.

Although implementations of a MR-PCIM for detachable multi-host computing systems have been described in language specific to structural features and/or methods, it is to be understood that the present subject matter is not necessarily limited to the specific features or methods described. Rather, the specific features and methods are disclosed as exemplary implementations of the MR-PCIM.

We claim:

1. A Multi-Root Peripheral Component Interconnect (PCI) Manager (MR-PCIM) configured to:
    enumerate at least one peripheral device coupled to at least one of a primary multi root input-output virtualization (MR-IOV) switch and a secondary multi root input-output virtualization (MR-IOV) switch associated with the MR-PCIM, wherein the primary MR-IOV switch and the secondary MR-IOV switch reside at separate processing units of a multi-host computing system, coupled through a physical cross-link;
    generate a system peripheral component interconnect express (PCIe) connectivity table for the primary MR-IOV switch, wherein the system PCIe connectivity table is indicative of ports and cross-link through which the at least one peripheral device is coupled to the at least one of the primary MR-IOV switch and the secondary MR-IOV switch; and
    translate the system PCIe connectivity table to generate a translated system PCIe connectivity table for the secondary MR-IOV switch, wherein the translation is based on coupling of the at least one peripheral device with at least one of the secondary MR-IOV switch and the primary MR-IOV switch.

2. The MR-PCIM as claimed in claim 1, wherein the MR-PCIM is further configured to store a time stamp for the generated system PCIe connectivity table based on the enumeration.

3. The MR-PCIM as claimed in claim 1, wherein the MR-PCIM is further configured to:
    generate one or more bridge table and switch table for the primary MR-IOV switch, wherein the generation is based on the at least one peripheral device; and
    translate the one or more bridge table and switch table for the secondary MR-IOV switch, associated with the at least one peripheral device; wherein the translation is based on coupling of the at least one peripheral device with at least one of the secondary MR-IOV switch and the primary MR-IOV switch.

4. The MR-PCIM as claimed in claim 1, wherein the MR-PCIM is further configured to provide the translated system PCIe connectivity table to a secondary MR-PCIM coupled to the secondary MR-IOV switch.

5. A Multi-Host computing system for sharing at least one peripheral device among a plurality of processing units, the multi-host computing system comprising:
    a detachable unit;
    a base unit;
    a plurality of multi root input-output virtualization (MR-IOV) switches, one or more MR-IOV switch among the plurality of MR-IOV switches residing in each of the plurality of processing units, wherein each of the plurality of MR-IOV switches is configured to implement virtual switches for virtualization of the at least one peripheral device;
    a plurality of Multi-Root Peripheral Component Interconnect (PCI) managers (MR-PCIMs), at least one among the plurality of MR-PCIMs coupled to each of the plurality of MR-IOV switches; wherein a primary MR-PCIM from amongst the plurality of MR-PCIMs is configured to:
  generate a system peripheral component interconnect express (PCIe) connectivity table for a primary MR-IOV switch from amongst the plurality of MR-IOV switches, associated with the at least one peripheral device; wherein the system PCIe connectivity table is indicative of ports and cross-link through which the at least one peripheral device is coupled to a respective MR-IOV switch from amongst the plurality of MR-IOV switches; and
  translate the system PCIe connectivity table to generate a translated system PCIe connectivity table for a secondary MR-IOV switch from amongst the plurality of MR-IOV switches, wherein the translation is based on coupling of the at least one peripheral device with the plurality of MR-IOV switches.

6. The Multi-Host computing system as claimed in claim 5, wherein the multi-host computing system further comprises a physical cross-link to enable communication among the plurality of MR-IOV switches.

7. The Multi-Host computing system as claimed in claim 5, wherein the multi-host computing system further comprises a secondary MR-PCIM from amongst the plurality of MR-PCIMs, coupled to the secondary MR-IOV switch, configured to enumerate one or more peripheral devices other than the at least one peripheral device coupled to the secondary MR-IOV switch.

8. The Multi-Host computing system as claimed in claim 7, wherein the primary MR-PCIM is further configured to provide the translated system PCIe-connectivity table to the secondary MR-PCIM over a physical cross-link configured to enable, communication among the plurality of MR-IOV switches.

9. The Multi-Host computing system as claimed in claim 8, wherein the primary MR-PCIM is further configured to provide the translated system PCIe-connectivity table to the secondary MR-PCIM based in part on at least one of an expiry of a periodic time interval, on removal and addition of a peripheral device with respect to the MR-PCIMs, on initiation of a dynamic attach process of the detachable unit to the base unit, and on initiation of a dynamic detach process of the detachable unit to the base unit.

10. The Multi-Host computing system as claimed in claim 8, wherein the secondary MR-PCIM is configured to synchronize the translated system PCIe-connectivity tables with respect to the primary MR-PCIM on determining a physical attachment of the detachable unit and the base unit based in part on at least one of a time-stamp of the translated system PCIe connectivity tables, and a unique hash pertaining to each of the translated system PCIe connectivity tables.

11. The Multi-Host computing system as claimed in claim 8, wherein the detachable unit and the base unit are in different power states.

12. The Multi-Host computing system as claimed in claim 7, wherein the secondary MR-PCIM is further configured to time stamp the translated system PCIe connectivity table based on enumeration of the one or more peripheral devices other than the at least one peripheral device.

13. The Multi-Host computing system as claimed in claim 5, wherein the primary MR-PCIM is identified among the plurality of MR-PCIMs based on a number of peripheral devices attached to each of the plurality of MR-PCIM.

14. The Multi-Host computing system as claimed in claim 5, wherein the primary MR-PCIM is identified among the plurality of MR-PCIMs based on a pre-defined static configuration.

15. The Multi-Host computing system as claimed in claim 5, wherein the primary MR-PCIM is further configured to time stamp the generated system PCIe connectivity table and the translated system PCIe connectivity table, wherein the time stamp provides information of a last time instance when enumeration of a peripheral device from among the at least one peripheral device was completed.

16. The Multi-Host computing system as claimed in claim 5, wherein the secondary MR-PCIM is further configured to:
  receive and store the translated system PCIe connectivity tables prior to a physical detachment of the detachable unit and the base unit, wherein both the detachable unit and the base unit are in power ON state; and
  control the peripheral devices connected to the detachable unit based on the translated system PCIe connectivity tables on detecting the physical detachment of the detachable unit and the base unit.

* * * * *